May 8, 1951  C. GERST  2,551,939
MULTIPLE CLUTCH MECHANISM
Filed Feb. 15, 1947  2 Sheets-Sheet 1
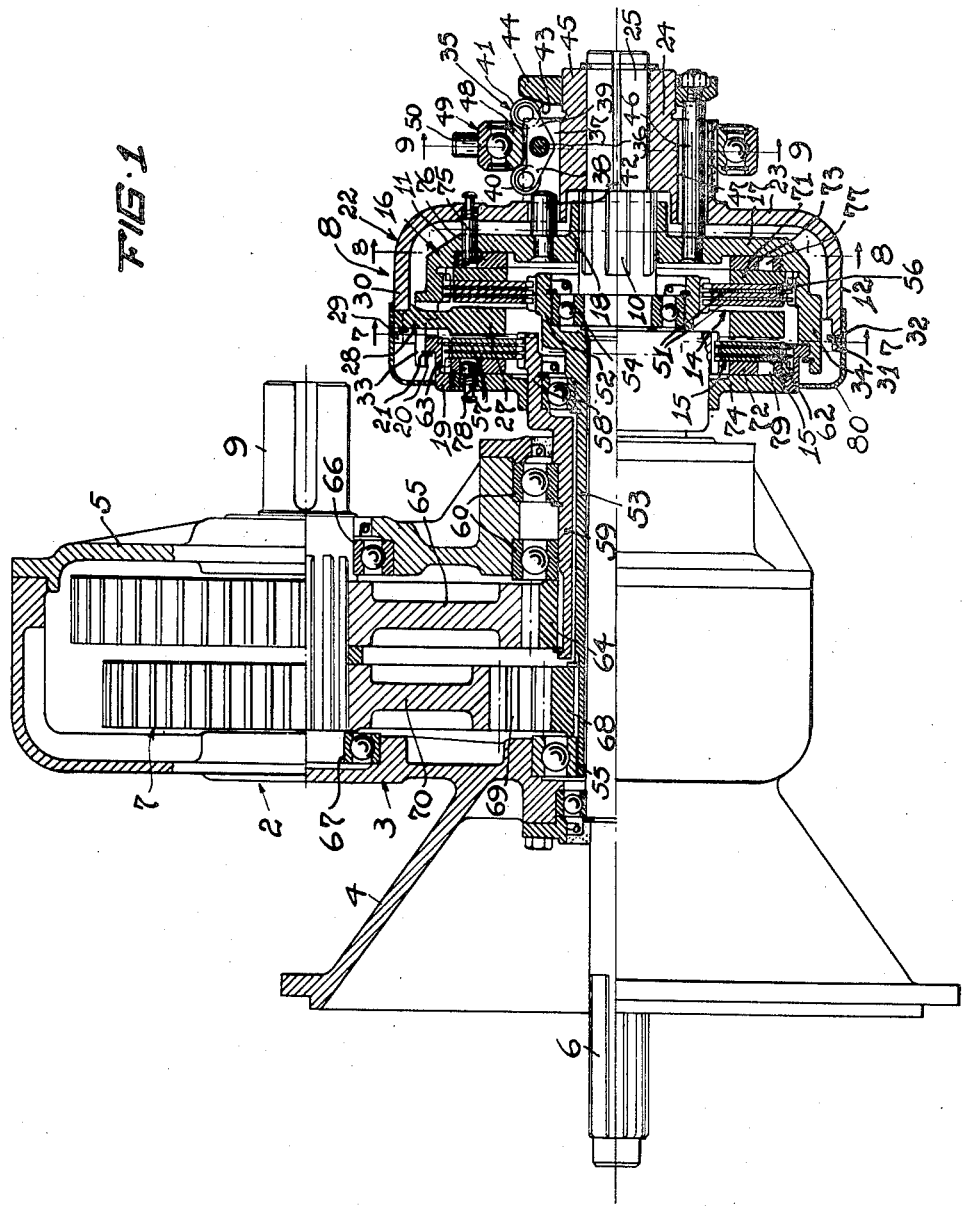
INVENTOR.
CHRIS GERST
BY
ATT

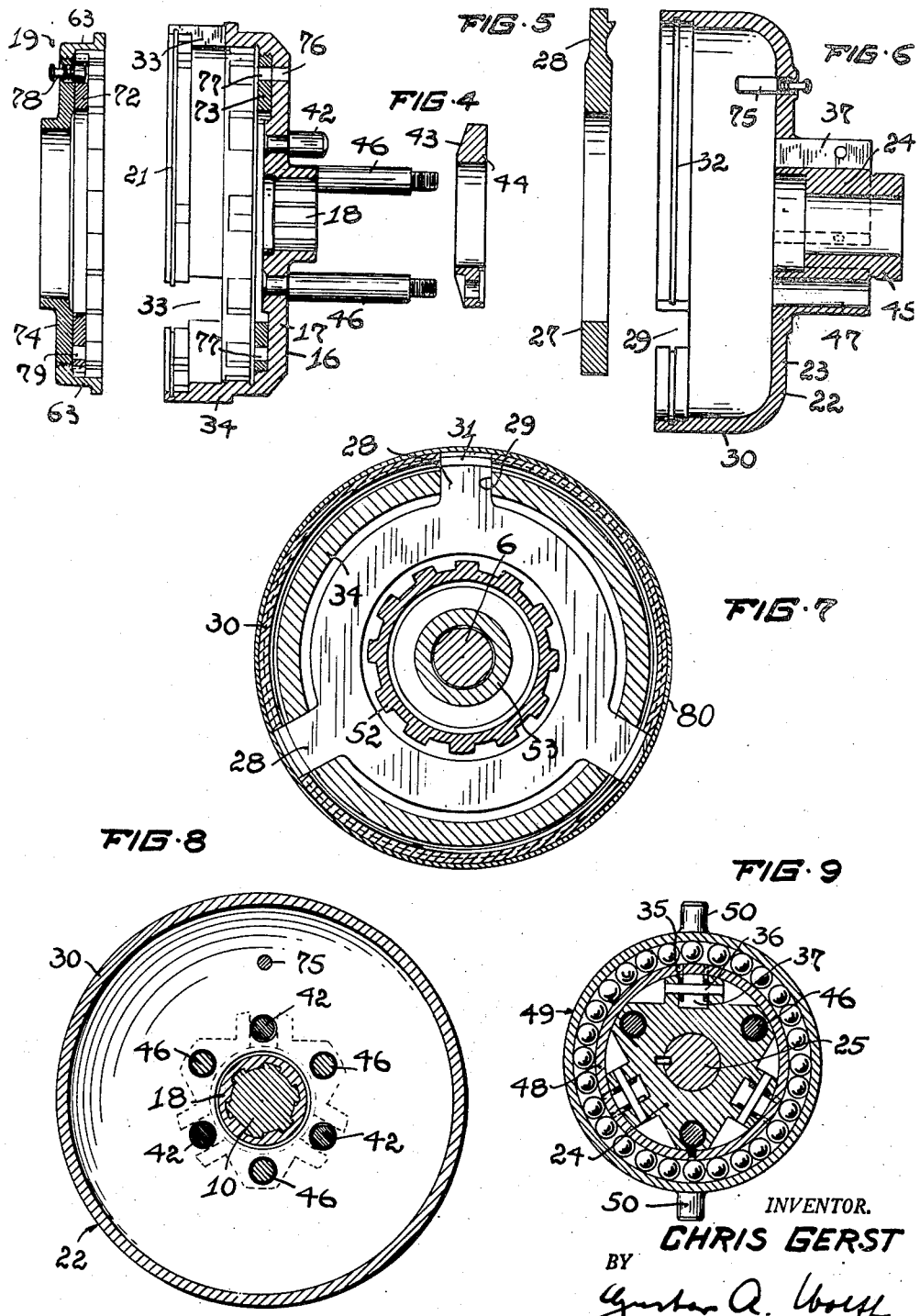

Patented May 8, 1951

2,551,939

UNITED STATES PATENT OFFICE 2,551,939

MULTIPLE CLUTCH MECHANISM

Chris Gerst, Detroit, Mich., assignor to The Transmission & Gear Company, Dearborn, Mich., a corporation of Michigan Application February 15, 1947, Serial No. 728,842

12 Claims. (Cl. 192—48)

This invention relates in general to friction clutches in which independently rotatable driving and driven members are coupled with each other by a plurality of friction disks brought into frictional cooperation by clamping the disks between backing and clamping plates and is more particularly concerned with improvements in two-way friction clutches of the above type especially suitable for use with two ratio or reversible transmissions such as marine transmission, mixer transmissions, etc.

The primary object of the present invention is the provision of an improved two-way friction clutch of the positive locking type which includes a single backing plate and a clamping plate structure with two laterally spaced clamping plates, the clamping plates being arranged to effect in cooperation with the backing plate selective actuation of either of two clutch disk assemblies so as to permit forward rotation of the driven shaft of a transmission or quick and effective change of the drive ratio of such driven shaft by shifting of the two-way friction clutch instead of shifting the gears of the transmission.

Another object of the invention is the provision of an improved two-way friction clutch which includes a single backing plate and a clamping plate structure with two laterally spaced clamping plates, the clamping plate structure being non-rotatably and axially shiftably coupled with the backing plate and the backing plate being arranged between the clamping plates to effect selective actuation of either two clutch disk assemblies arranged between the clamping plates in symmetrical relation with respect to the backing plate for rotation of a shaft by the one clutch disk assembly or a quill surrounding the shaft by the other one clutch disk assembly.

A further object of the invention is the provision of an improved two-way friction clutch which includes a backing plate structure with a single backing plate and a clamping plate structure with two laterally spaced clamping plates, which has the backing plate partly encircled by the clamping plate structure and the latter structure axially shiftably and non-rotatably coupled with the backing plate structure and which includes means to effect selective frictional coupling of either of two disk assemblies by cooperation of the two clamping plates with the single backing plate.

Still another object of the invention is the provision of an improved two-way friction clutch which includes a backing plate structure with a single backing plate and a clamping plate structure with two laterally spaced, individually adjustably mounted clamping plates, which has its backing plate and clamping plate structures axially shiftably and non-rotatably interengaged and which has the backing plate arranged between the clamping plates to permit selective clutching operations on clutch disk assemblies arranged in the clamping plate structure between the clamping plates and at opposite sides of the backing plate.

With the above and other incidental objects in view, the invention has other marked improvements and superiorities which radically distinguish it from presently known structures. These improvements or superior characteristics embodying certain novel features of construction are clearly set forth in the appended claims, and a preferred embodiment of the invention is hereinafter shown with reference to the accompanying drawings forming part of the specification.

In the drawings:

Fig. 1 is a longitudinal sectional view through a reversible transmission coupled with a two-way clutch structure according to the invention adapted to effect direct or reversed rotation of the output shaft of the transmission.

Figs. 2 through 6 show the clamping plate and backing plate structures of the two-way clutch in partly disassembled condition, thus Fig. 2 is a longitudinal sectional view through the cover member of the clamping plate structure;

Fig. 3 is a longitudinal sectional view through the body member of the clamping plate structure;

Fig. 4 is a longitudinal sectional view through the shifting collar member at the end of the clamping plate structure;

Fig. 5 is a longitudinal sectional view through the backing plate of the backing plate structure; and Fig. 6 is a longitudinal sectional view through the backing plate supporting member of the backing plate structure.

Fig. 7 is a cross sectional view through the two-way clutch structure shown in Fig. 1, the section being taken on line 7—7 of said figure; and Fig. 8 is another cross sectional view through the two-way clutch structure shown in Fig. 1, the section being taken on line 8—8 of said figure; and Fig. 9 is a cross sectional view through the clutch structure shown in Fig. 1, the section being taken on line 9—9 of Fig. 1.

Referring now more particularly to the transmission and clutch structure shown in the drawings, reference numeral 2 denotes a transmission which embodies a main housing 3 provided at its rear end with a bell housing 4 and closed at its front end by a cover member 5. Housing 3 mounts an input shaft 6 which by means of gearing 7 and a two-way clutch mechanism 8 transfers power to an output shaft 9, as will be described hereinafter.

The two-way clutch mechanism, which is supported on the splined portion 10 of input shaft 6, embodies a clamping plate structure 11 and a backing plate structure 12 slidably and non-rotatably coupled with each other for joint rotation by input shaft 6. The structures 11 and 12 are non-rotatably and axially shiftably interengaged with each other to permit selective coupling of input shaft 6 with output shaft 9 by either one of two individual clutch disk assemblies 14 and 15, which assemblies are arranged in the clamping plate structure 11 opposite the backing plate of backing plate structure 12.

The clamping plate structure 11 embodies a cup-shaped body 16 having extended from its wall 17 an internally splined hub 18 non-rotatably slidably engaged with the splined portion 10 of input shaft 6 and mounting opposite to wall 17 a ring-shaped, flanged cover member 19 which is non-rotatably extended into body 16 and held in position by a locking ring 20 seated in a groove 21 in body 16.

The backing plate structure 12 embodies a cup-shaped body 22 dimensioned to permit free extension of body 16 thereinto. Body 22 has extended from its wall 23 a slotted hub member 24 sleeved upon the reduced end portion 25 of input shaft 6 and mounts opposite to wall 23 a ring-shaped backing plate 27 non-rotatably secured to body 22 by radial driving lugs 28 extended from plate 27 into slots 29 in the circumferential wall 30 of body 22. A locking ring 31 seated in a groove 32 of body 22 is used to secure plate 27 in proper position. The clamping plate structure is partly extended into body 22 so that plate 27 is substantially arranged within body 16, only the driving lugs 28 being extended through slot 33 in the circumferential wall 34 of body 16. This relationship of the two structures 11 and 12 provides the clutch structure with a single backing plate arranged between two laterally spaced clamping plates.

Actuation of the clutch structure is effected by axial shifting of clamping plate structure 11 with respect to backing plate structure 12. For such purpose backing plate structure 12 mounts a plurality of dual clutch levers 35 which are pivotally mounted on pins 36 bridging the slots 37 of hub member 24. These dual clutch levers each have mounted on their symmetrically arranged arms 38 and 39 rollers 40, 41, rollers 40 cooperating with studs 42 secured to wall 17 and being extended into the slots 37 of hub member 24, and rollers 41 cooperating with the inclined wall 43 of a collar member 44 slidably mounted on the end portion 45 of hub 24 and secured to the body 16 of clamping plate structure 11 by means of bolts 46 extended through bores 47 in hub 24. Shifting of clamping plate structure 11 is effected by the inner race member 48 of a ball bearing 49. This ball bearing provides a shifting collar adapted to tilt levers 35 in opposite direction so as to effect shifting of the clamping plate structure in opposite directions, as will readily be seen from inspection of Fig. 1 of the drawing. To facilitate such shifting, ball bearing 49 includes a pair of oppositely arranged trunnions 50 adapted to cooperate with a shifting fork of common construction (not shown).

Clutch disk assembly 14 includes a plurality of friction driven disks 51 which are non-rotatably and axially shiftably secured to the enlarged, splined end portion 52 of a driven sleeve member 53 arranged concentrically with respect to input shaft 6 and mounted in bearings 54, 55 and a plurality of friction driving disks 56 non-rotatably and axially shiftably secured to the internally toothed circumferential wall 34 of body 16. Clutch disk assembly 15 includes a plurality of friction driven disks 57 non-rotatably and axially shiftably secured to the enlarged, splined end portion 58 of a second driven sleeve member 59 arranged concentrically with respect to sleeve member 53 and input shaft 6 and mounted in bearings 60, and a plurality of friction driving disks 62 non-rotatably and axially shiftably secured to the internally toothed flange 63 of cover member 19.

The sleeve member 59 mounts on its rear end a pinion 64 which is in constant mesh with a gear 65 secured to output shaft 9 journaled in ball bearings 66, 67 in housing 3, and the sleeve member 53, the reverse drive sleeve, mounts on its rear end a pinion 68 which is in constant mesh with an idler gear 69 meshing a gear 70 secured to output shaft 9. This arrangement permits simple reversing of rotation of output shaft 9 by operation of the two-way clutch structure without engagement or disengagement of the gears.

The clamping plate structure 11 as shown, embodies clamping plates 71, 72 arranged directly opposite clutch disk assemblies 14 and 15. These clamping plates are non-rotatably and axially slidably mounted on body 16 and cover member 19 and for such purpose include peripheral teeth engaging the internally toothed circumferential wall 34 of body 16 and the internally toothed flange 63 of cover member 19. This arrangement of the clamping plates and their mounting provides a medium for adjusting the clutch structure as the friction disks of clutch disk assemblies 14 and 15 wear and it becomes necessary to readjust the initial position of the clamping plates owing to the fixed range of movement of lever arms 38 and 39. To effect an adjustment of the clamping plates, there are provided backing rings 73 and 74 which are threadedly connected with body 16 and cover member 19. Clamping plate 71 is adjusted by rotation of backing ring 73 which is held in adjusted position by a spring-pressed plunger 75 mounted in the rear wall 23 of cup-shaped body 22 and extended through a bore 76 in wall 17 of body 16 into one of a plurality of circumferentially disposed holes 77 in backing ring 73. Clamping plate 72 is adjusted by rotation of backing ring 74 which is held in adjusted position by a spring-pressed plunger 78 mounted in backing ring 74 and extended into one of a plurality of circumferentially disposed holes 79 in the non-rotatable and axially shiftable clamping plate 72.

The thus described clutch structure which includes a sheet metal cover member 80 is constructed and designed to be located on the outside of a transmission or supporting housing so as to be readily and easily accessible for adjustment and repair.

In describing the operation of the improved clutch structure it will be assumed that, as shown in Fig. 1, the clamping plate structure is in neutral position and that input shaft 6 and hence all elements of the clutch structure, except friction driven disks 51 and 57, are rotating. If it is desired to directly drive output shaft 9, ball bearing 49 is shifted toward the right to cause a movement of levers 35 so that rollers 41 on lever arms 39 engage the inclined wall 43 of collar member 44 and effect axial movement of the clamping plate structure until the disks of clutch disk assembly 15 are locked with each other and sleeve 59, by pinion 64, rotates gear 65 secured to output shaft 9. A reverse drive is transmitted to output shaft 9 when ball bearing 49 is moved toward the left to cause a movement of levers 35 so that rollers 40 on lever arms 38 engage the studs 42 on body 16 of clamping plate structure 11 and effect axial movement of the clamping structure until the disks of clutch disk assembly 14 are locked with each other and sleeve 53, by pinion 68 and idler gear 69, rotates gear 70 also secured to the output shaft 9.

Having thus described my invention:
What I claim is:

1. In clutch mechanism, a drive member, two clutch devices jointly including a single backing plate rigidly attached to said drive member and a shiftable clamping plate structure with a cup-shaped unitary body slidably and non-rotatably coupled with said backing plate, and laterally spaced clamping plates individually, adjustably secured to said body in symmetrical relation with respect to said backing plate.

2. In clutch mechanism, a drive member, two clutch devices jointly including a single backing plate structure rigidly attached to said drive member and a unitary clamping plate structure non-rotatably and axially shiftably inter-engaged with said backing plate structure, said backing plate structure embodying a chambered body portion and a backing plate supported thereby, and said clamping plate structure embodying a unitary body encircled by and inter-engaged with said chambered body portion and laterally spaced clamping plates secured to said body in symmetrical relation with respect to the backing plate of said backing plate structure.

3. In clutch mechanism, a drive member, two clutch devices jointly including unitary backing plate and clamping plate structures, the backing plate structure embodying a single backing plate rigidly attached to said drive member and the clamping plate structure embodying a unitary body and laterally spaced clamping plates rigidly secured thereto and positioned at opposite sides of the backing plate, and a single shifting means mounted on said backing plate structure adapted to effect selective clutching action of the two clutches by axial shifting of said unitary body of said clamping plate structure.

4. A clutch mechanism as described in claim 3, wherein the backing plate of the backing plate structure includes radial lugs, and wherein the unitary body of said clamping plate structure is formed with slots having said lugs extended therethrough for slidable and nonrotatable engagement of said body with the radial lugs of said backing plate.

5. A clutch mechanism as described in claim 3, wherein the backing plate structure includes a body mounting said backing plate, and wherein the unitary body of said clamping plate structure is non-rotatably and axially shiftably interlocked with peripheral extensions on the backing plate of said backing plate structure.

6. In clutch mechanism, a drive member, two spaced friction disk assemblies, a unitary clamping plate structure and a single backing plate structure rigidly attached to said drive member, and a unitary clamping structure axially shiftably inter-engaged with said clamping plate structure for selectively actuating either one of the friction disk assemblies, said clamping plate structure including a unitary body and laterally spaced clamping plates secured thereto, and said backing plate structure including a unitary body and a single backing plate secured thereto and arranged between the said clamping plates, dual lever means pivoted to the unitary body of said backing plate structure, and means on the unitary body of said clamping plate structure co-operating with said dual lever means in shifting the unitary body of said clamping plate structure in opposite directions.

7. A clutch mechanism as described in claim 6, wherein said supporting means for the backing plate structure includes a slotted hub portion having arranged in its slots the said dual lever means, and wherein the means on said supporting means for the clamping plate structure includes means slidably mounted on the said hub portion.

8. A clutch mechanism as described in claim 6, wherein the supporting means for said backing plate structure are non-rotatably and slidably interengaged with each other, wherein said supporting means for the backing plate structure includes a slotted hub portion having arranged in its slots the said dual lever means, wherein the means on said supporting means for the clamping plate structure consists of studs and collar means spaced from said studs and slidably mounted on the hub portion, and wherein the said dual lever means are arranged between said studs and collar means for co-operation therewith in clutch actuating operations.

9. In clutch mechanism, a drive member, a pair of clutches, a backing plate structure including a housing rigidly attached to said drive member and a backing plate mounted in said housing, a clamping plate structure including a housing with individually adjustably mounted clamping plates arranged in laterally spaced relation in said latter housing, said two housings being non-rotatably and axially shiftably inter-engaged with each other by the backing plate of said backing plate structure and partly extended into each other to position the backing plate between the clamping plates, dual lever means pivotally mounted on the housing of said backing plate structure, and means on the housing of said clamping plate structure cooperating with said dual lever means in shifting said clamping plate structure in opposite directions to actuate by the respective clamping plate either one of said clutches.

10. A clutch mechanism such as described in claim 9, wherein the housing of said clamping plate structure is smaller in diameter than the housing of said backing plate structure and partly extended thereinto, wherein the housing of said backing plate structure includes a hub portion, wherein said dual lever means is pivotally mounted on the said hub portion, and wherein said hub portion slidably supports a collar member cooperating with said dual lever means in clutching operations.

11. A clutch mechanism such as described in claim 9, wherein the clamping plates of said clamping plate structure are non-rotatably and axially shiftably mounted in its housing, wherein there are provided backing rings threadedly engaged with said clamping plate structure housing to back up said clamping plates and adjust their position with respect to each other, and wherein means are provided to lock said backing rings in their adjusted positions.

12. A clutch mechanism such as described in claim 9, wherein the clamping plates of said clamping plate structure are non-rotatably and axially shiftably mounted in its housing, wherein there are provided backing rings threadedly engaged with said clamping plate structure housing to back up said clamping plates and adjust their position with respect to each other, wherein means are provided to lock the backing rings in their adjusted positions, and wherein one of said means is mounted in one of the backing rings and the other one of said means is mounted in the housing of the backing plate structure.

CHRIS GERST.

REFERENCES CITED

The following references are of record in the file of this patent:

UNITED STATES PATENTS

| Number | Name | Date |
|---|---|---|
| 773,951 | MacGregor et al. | Nov. 1, 1904 |
| 1,845,332 | Reece et al. | Feb. 16, 1932 |
| 2,057,559 | De Backer et al. | Oct. 13, 1936 |
| 2,125,433 | Dunkelow | Aug. 2, 1938 |
| 2,229,910 | Adamson et al. | Jan. 28, 1941 |
| 2,396,456 | Compodonico | Mar. 12, 1946 |
| 2,462,457 | Berndtson | Feb. 22, 1949 |
| 2,488,540 | Hollingsworth | Nov. 22, 1949 |